United States Patent [19]
Morris

[11] Patent Number: 5,961,367
[45] Date of Patent: Oct. 5, 1999

[54] RETRACTABLE TURKEY CALL STRIKER

[76] Inventor: David W. Morris, P.O. Box 224, Buchanan, Va. 24066

[21] Appl. No.: 09/132,213

[22] Filed: Aug. 11, 1998

Related U.S. Application Data

[60] Provisional application No. 60/057,796, Sep. 8, 1997.

[51] Int. Cl.$^6$ .............................. A63H 5/00; B43K 21/00
[52] U.S. Cl. ........................... 446/397; 446/418; 401/84; 401/99
[58] Field of Search .................................. 446/397, 404, 446/408, 418, 421; 43/2; 401/13, 29, 32, 33, 49, 82, 84, 99

[56] References Cited

U.S. PATENT DOCUMENTS

| | | | |
|---|---|---|---|
| 954,133 | 4/1910 | Reed | 401/99 |
| 1,054,229 | 2/1913 | Methven | 401/99 X |
| 1,245,739 | 11/1917 | Krell | 401/84 |
| 1,861,466 | 6/1932 | Bafetti | 401/29 X |
| 2,025,181 | 12/1935 | Simon . | |
| 2,495,342 | 1/1950 | Moore | 401/84 |
| 2,958,157 | 11/1960 | Tanehill . | |
| 3,001,531 | 9/1961 | Gazdik | 401/49 |
| 3,208,184 | 9/1965 | Wisor . | |
| 3,265,201 | 8/1966 | Edwards | 401/84 |
| 3,716,943 | 2/1973 | Orzetti | 446/397 |
| 4,310,986 | 1/1982 | Jacobs | 446/397 |
| 4,648,852 | 3/1987 | Wingate . | |
| 4,904,221 | 2/1990 | Taylor . | |
| 4,988,325 | 1/1991 | Alderson et al. | 446/397 |
| 5,048,989 | 9/1991 | Stageman | 401/84 X |
| 5,529,526 | 6/1996 | Wesley | 446/397 |

*Primary Examiner*—D Neal Muir
*Attorney, Agent, or Firm*—Richard C. Litman

[57] ABSTRACT

A bird call striker made up of a body, a dowel assembly, and an end cap. The body has a generally "Z"-shaped channel having an extension slot and a retraction slot. The invention may also have a clip mounted to the outside of the body for carrying on a belt or shirt pocket. The dowel assembly has a rod that slidingly communicates with the guide bushing between an extended position and a retracted position. A knob having a threaded shaft is perpendicularly and transversely mounted to the rod to assist the user in extending and retracting the rod. An extension spring assists in removably locking the knob in the extension slot, thereby maintaining the rod in extended position, and a retraction spring assists in removably locking the knob in the retraction slot, thereby maintaining the rod in retracted position. Additionally, the knob may be twisted to removably engage the distal end of the shaft with the inside of the body, thereby allowing the user to partially extend the rod from the body. When the rod is in retracted position, the body protects the rod from breakage and other damage due to the hazards of wild turkey hunting and observing.

11 Claims, 4 Drawing Sheets

RETRACTABLE TURKEY CALL STRIKER

CROSS-REFERENCE TO RELATED APPLICATION

This application claims the benefit of U.S. Provisional Patent Application Ser. No. 60/057,796, filed Sep. 8, 1997.

BACKGROUND OF THE INVENTION

1. FIELD OF THE INVENTION

The present invention relates to a striker for a turkey call, and more particularly, to a turkey call striker with a retractable rod to facilitate portability of the striker and to prevent damage to the rod.

2. DESCRIPTION OF RELATED ART

Devices used to call turkeys and other game birds are well known in the prior art. Hunters and photographers have used many different devices, which are known as "calls," to lure these birds into range for hunting or observing. Unfortunately, many of these calls are expensive, with electronic calls often costing thousands of dollars. Many of the more economical calls require hours of practice to adequately reproduce the sounds of a wild turkey.

A typical bird call consists of a stylus-shaped striker and a plate. The striker is moved along the surface of the plate in various ways to reproduce different sounds of game birds. Given its stylus shape, the striker portion of a turkey call is especially prone breaking or being otherwise damaged the user. These one-piece strikers are additionally awkward to carry, as the user is often crouched behind a bush or similar object, often in adverse weather. Under such conditions the striker is particularly susceptible to damage.

Turkey calls employing one-piece strikers are have been disclosed in the prior art. One such device is discussed in U.S. Pat. No. 2,025,181 which issued to N. Simon on Dec. 24, 1935. This device comprises a sound-amplifying shell and a metal spring projecting therefrom. The tip spring is rubbed against a block of wood to produce turkey-like sounds.

U.S. Pat. No. 2,958,157 which issued to W. P. Tannehill on Nov. 1, 1960, discloses a bird call comprising a sound-producing box wherein the top thereof houses a removable sound-producing surface. The box additionally has a vibrating stylus that, when employed in conjunction with the sound producing surface, produces sounds similar to that of a wild turkey. Similarly, U.S. Pat. No. 3,208,184 discloses a turkey caller comprising a striker post and a hollow sound intensifying chamber having a friction surface. The free end of the striker post is rubbed against the friction surface to produce the desired turkey sound. The post is stored inside of the cap or cover when not in use.

U.S. Pat. No. 4,648,852 which issued to Wingate on Mar. 10, 1987, discloses a turkey call which comprises a hollow rectangular call box and a striker. The striker comprises a plastic tip and a sound chamber, and when the tip is frictionally rubbed against the call box, the sounds simultaneously emitted from the call box and the sound chamber simulate the call of a wild turkey. The striker of this invention is fragile and may be prone to breakage.

U.S. Pat. No. 4,904,221 which issued to A. Taylor on Feb. 27, 1997, discloses a Mississippi turkey caller comprises a plate glass plate and a striker having either a plexiglass handle or corncob handle. The striker is then rubbed across the plate to simulate the sounds of a wild turkey.

U.S. Pat. No. 4,988,325 which issued to Alderson et al. on Jan. 29, 1991, discloses a turkey call comprising a rectangular hollow call box having a stone striking surface thereon, and a call striker comprising a hollow dowel that slidingly engages into a hole in a damper. The damper functions to produce a variety of turkey-like sounds when the dowel is rubbed against the call box.

While turkey call strikers having dowels of adjustable, extrensible length are known in the related art, none of the above inventions and patents, taken either singly or in combination, is seen to describe the instant invention as claimed. Hence a turkey call striker solving the aforementioned problems is desired.

SUMMARY OF THE INVENTION

The present invention provides a striker having a retractable rod, for use with a wild turkey call striking surface such as a slate. The invention comprises a body, a dowel assembly, and an end cap. The body has a generally "Z"-shaped channel having an extension slot mounted near the distal end of the channel, and a retraction slot mounted near the proximal end of the channel. The body additionally has a guide bushing affixed to the open distal end, and may have a clip mounted to its outside.

The dowel assembly comprises a rod that slidingly communicates with the guide bushing between an extended position and a retracted position. Additionally, a knob having a threaded shaft is transversely and perpendicularly mounted to the rod to assist the user in extending and retracting the rod. An extension spring assists in removably locking the knob in the extension slot, thereby maintaining the rod in extended position. A retraction spring assists in removably locking the knob in the retraction slot, thereby maintaining the rod in retracted position. Additionally, by twisting the threaded shaft of the knob to removably engage the threaded knob with the inside wall of the body, the user may partially extend the rod from the body. When the rod is in retracted position, the body protects the rod from breakage due to the hazards of wild turkey hunting and observing.

Accordingly, it is a principal object of the invention to provide a fully collapsible and retractable turkey call striker that accurately produces the sound of a wild turkey, but will not break when sat on or when used under other adverse conditions.

It is another object of the invention to provide a turkey call striker that may easily and safely be transported.

It is a further object of the invention to provide a turkey call striker that may quickly and easily be either partially or fully retracted.

Still another object of the invention is to provide a turkey call striker that is easily and inexpensively manufactured.

It is an object of the invention to provide improved elements and arrangements thereof in an apparatus for the purposes described which is safe, inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
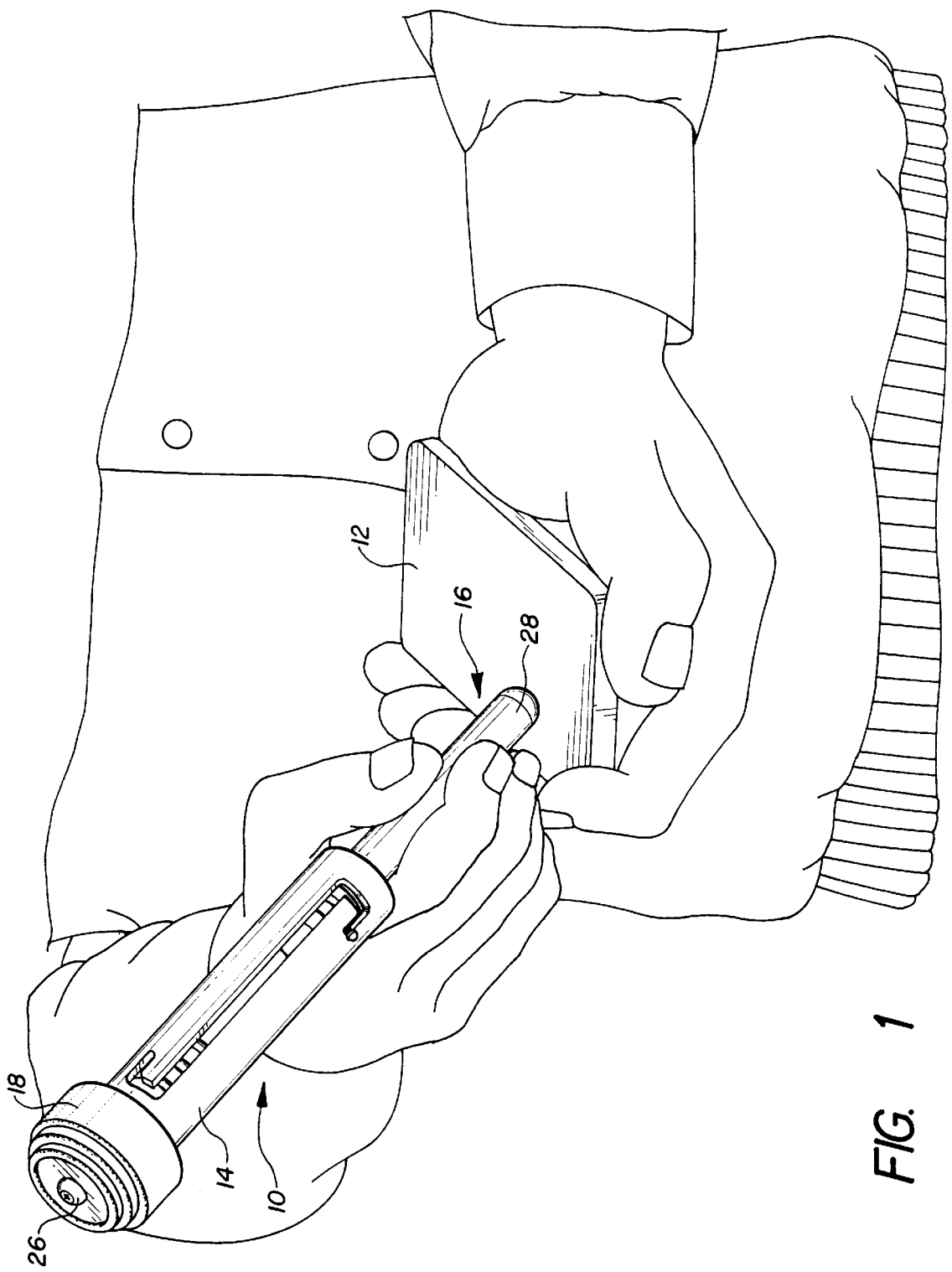
FIG. 1 is an environmental, perspective view of the turkey call striker according to the present invention.

Referring to the drawings wherein like numerals represent like elements, FIG. 1 is an environmental, perspective view of the turkey call striker 10 is shown in use with a plate 12. The striker 10 comprises a generally cylindrical body 14, a dowel assembly 16, and an end cap 18, and is designed for use with a plate 12 comprised of slate, but will work nearly as well with plates comprised of other materials, such as glass or metal.

Figure 2:
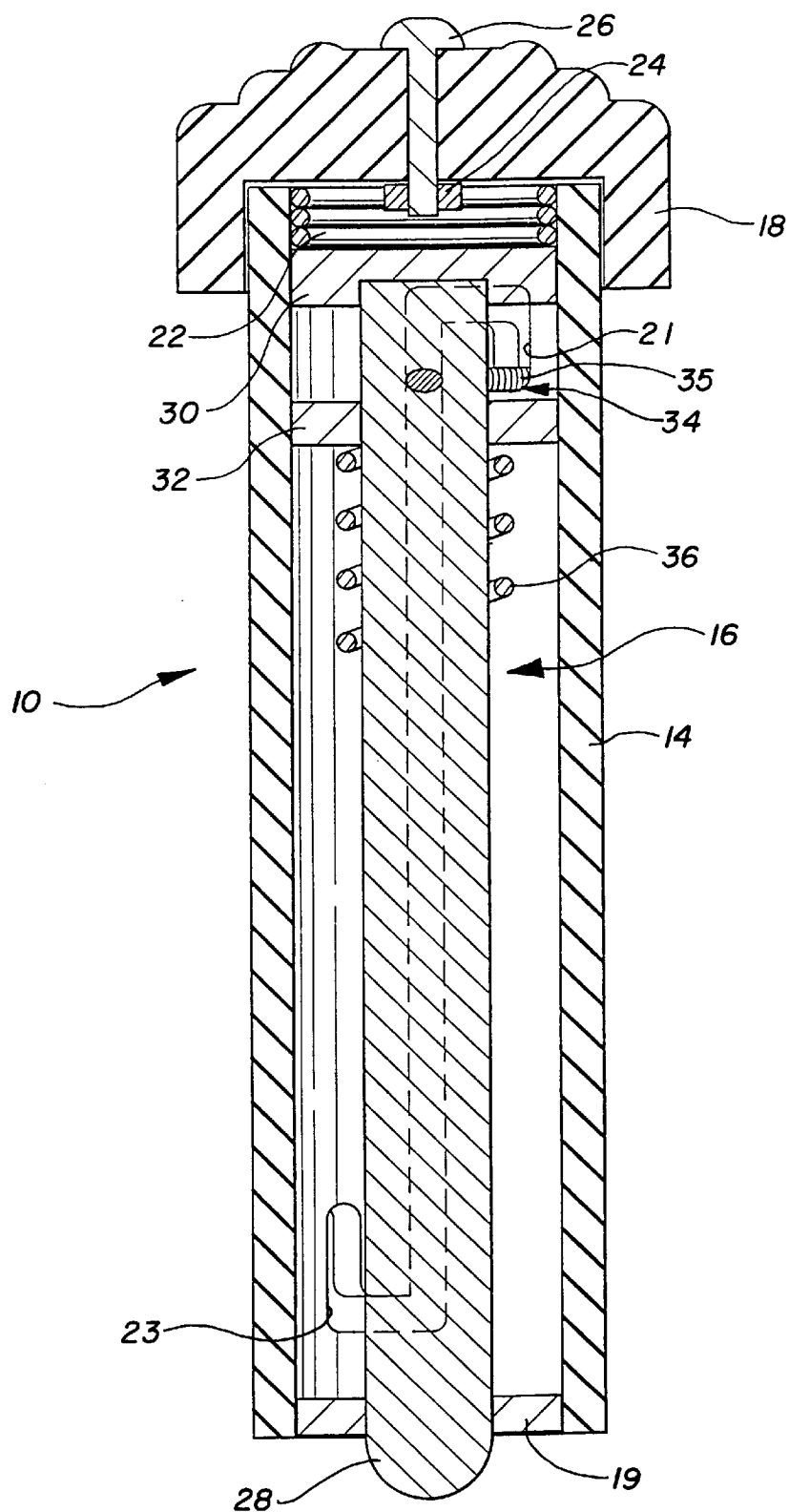
FIG. 2 is a sectional view of the present invention in retracted position.
Figure 3:
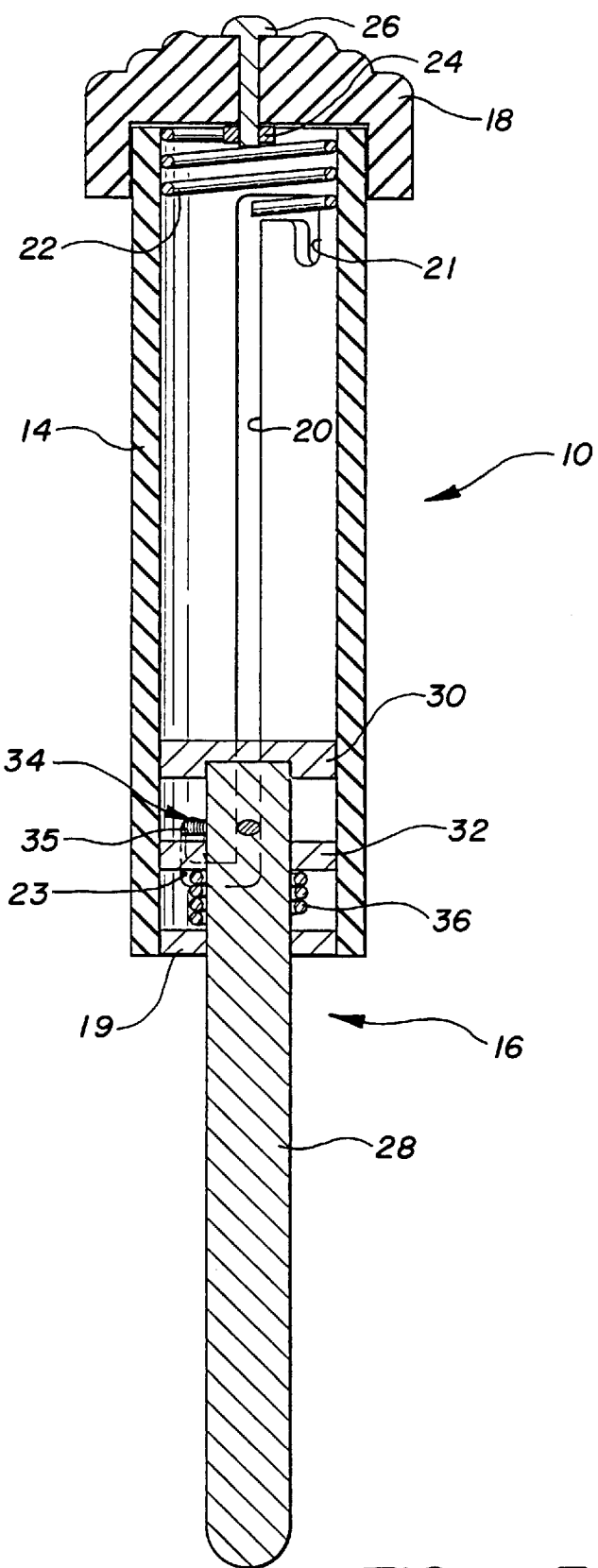
FIG. 3 is a sectional view of the present invention in extended position.
Figure 4:
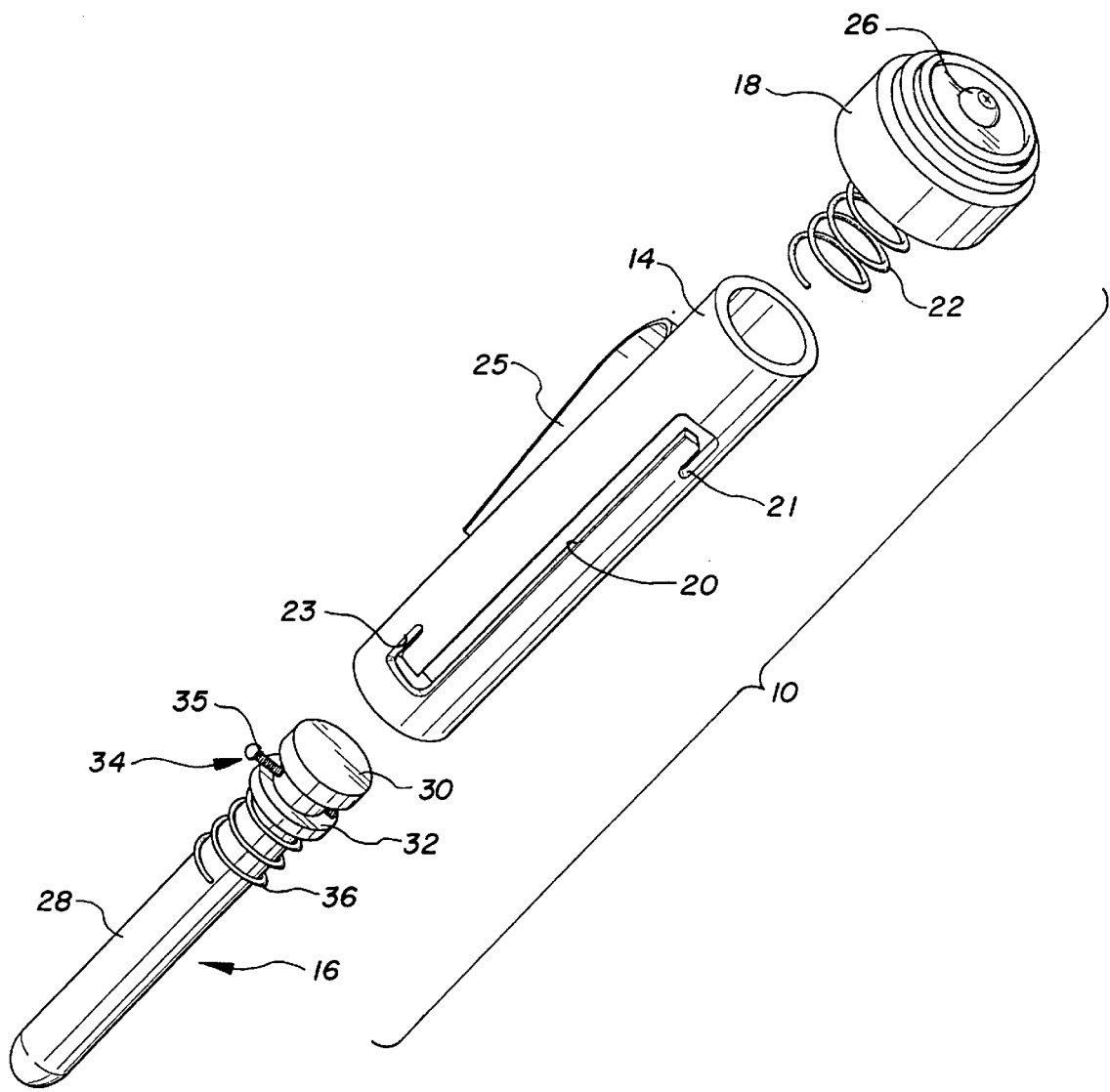
FIG. 4 is a perspective, exploded view of the present invention.

Referring now to FIGS. 2–4 generally, the body 14 has a guide bushing 19 mounted about the distal end of the body for slidingly engaging a rod. A generally "Z"-shaped knob-receiving channel 20 having a retraction slot 21 and an extension slot 23 is present along the length of the body 14. A clip 25 may be mounted to the outside of the body 14 to enable the user to attach the striker 10 to the user's belt or pocket.

The end cap 18 removably and sealingly fits over the open proximal end of the body 14 and has a retraction spring 22 mounted to the inside of the end cap. The retraction spring 22 is mounted to the end cap by a nut 24 threadedly secured over a screw 26, although other means for securing the retraction spring to the end cap may be employed in alternative embodiments.

The dowel assembly 16, when retracted, is predominantly disposed within the body 14 and has a rod 28 that slidingly communicates with the guide bushing 19, the rod sliding along a longitudinal axis in both a proximal direction to removably lock in a retracted position and a distal direction to removably lock in an extended position. A generally disc-shaped retraction bushing 30 is mounted to the distal end of the rod 28, and slidingly communicates with the inside surface of the body 14 of the striker 10. When the rod 28 is in retracted position, the retraction spring distally urges the rod.

A generally quoit-shaped extension bushing 32 is mounted about the rod 28 and below the retraction bushing 30, and further slidingly communicates with the inside surface of the body 14. Additionally, a knob 34 having a threaded shaft 35 is perpendicularly mounted to the rod 28, intermediate the retraction bushing 30 and extension bushing 32. The knob 34 radially extends beyond the "Z"-shaped channel 20 to assist the user in retracting and extending the rod 28 to and from the body 14.

Additionally, the knob 34 transversely and diametrically penetrates the rod 28 and may be twisted by the user to removably engage the distal end of the shaft 35 with the inside surface of the body 14, thereby enabling the user to use the striker 10 with the rod partially extended from the body.

An extension spring 36 is mounted about the rod 28, intermediate the extension bushing 32 and the distal end of the rod 28. When the rod 28 is in extended position, the extension spring 36 proximally urges the rod.

To extend the rod 28 from the body 14 from the retracted position, the user slides the knob 34 from the retraction slot 23 into the generally "Z"-shaped channel 20, whereupon the retraction spring 36 will distally urge the knob into the generally "Z"-shaped channel. The user continues to distally slide the knob 34 along the generally "Z"-shaped channel 20 until the knob engages the proximal end of the channel. Once the knob 34 cannot be moved any more distally, the knob is moved into the extension slot 23, thereby rotating the rod 28 about its longitudinal axis. The extension spring 36 proximally urges the rod 28 and the knob 34 engages the distal portion of the extension slot 23, thereby maintaining the rod in extended position and preventing the displacement of the rod from the extension slot.

To retract the rod 28 into the body 14 from the extended position, the user slides the knob 34 from the extension slot 23 into the generally "Z"-shaped channel 20, whereupon the extension spring 36 will proximally urge the knob into the generally "Z"-shaped channel. The user continues to proximally slide the knob 34 along the generally "Z"-shaped channel 20 until the knob engages the proximal end of the channel. Once the knob 34 cannot be moved any more proximally, the knob is moved into the retraction slot 23, thereby rotating the rod 28 about its longitudinal axis. The retraction spring 36 distally urges the rod 28 and the knob 34 engages the proximal portion of the retraction slot 23, thereby maintaining the rod in retracted position and preventing the displacement of the rod from the retraction slot. When the rod 28 is retracted within the body 14, the body protects the rod from possible breakage due to the hazards of wild turkey observing and hunting.

Additionally, the body 14, the rod 28, the guide bushing 19, the retraction bushing 30, the extension bushing 23 and the end cap 18 are ideally comprised of wood, plastic or rubber, however, these parts may be comprised of other materials in alternative embodiments.

It is to be understood that the present invention is not limited to the embodiments described above, but encompasses any and all embodiments within the scope of the following claims.

I claim:

1. A striker for use with a game call striking surface comprising:
    a body having:
        an inner surface and an outer surface;
        a proximal end and an open distal end;
        a generally Z-shaped channel for slidingly receiving a knob, said channel having a proximal end and a distal end;
    a dowel assembly comprising:
        a rod coaxially and rotatably disposed within said body and having a proximal end and a distal end, said rod slidingly communicating with said open distal end, between an extended position and a retracted position;
        a knob perpendicularly mounted to said rod intermediate a retraction bushing and an extension bushing, said knob slidingly engaging said generally Z-shaped channel and further radially extending a predetermined distance beyond said generally Z-shaped channel; and
    means for removably maintaining said rod in said extended position; and
    means for removably maintaining said rod in said retracted position.

2. The striker according to claim 1 wherein said body further comprises a guide bushing affixed to said open distal end and wherein said rod slidingly communicates with said guide bushing between an extended position and a retracted position.

3. The striker according to claim 2 wherein said dowel assembly further comprises:

a retraction bushing mounted to a proximal end of said rod and slidingly communicating through an extension spring with said guide bushing at said distal end;

an extension bushing mounted below said retraction bushing and coaxially mounted about said rod at a predetermined distance and slidingly communicating with said inner surface of said body; and said extension spring coiled about said rod below said extension bushing, said spring engaging said guide bushing at said distal end when said rod is in said extended position, and said spring proximally urging said extension bushing when said rod in said extended position.

4. The striker according to claim 1 wherein:

said proximal end of said body has an inner surface and comprises a retraction spring mounted to said inner surface of said proximal end, said retraction spring distally urging said rod when said rod is in said retracted position.

5. The striker according to claim 1 wherein said body further comprises an end cap enclosing said proximal end of said body and having:

an inner surface and an outer surface; and a retraction spring mounted to said inner surface of said end cap, said retraction spring distally urging said rod when said rod is in said retracted position.

6. A striker for use with a game call striking surface comprising:

a body having:
   an inner surface and an outer surface;
   a proximal end and an open distal end;
   a guide bushing affixed to said open distal end;
   a generally Z-shaped channel for slidingly receiving a knob, said channel having a proximal end and a distal end;

a dowel assembly comprising:
   a rod coaxially and rotatably disposed within said body and having a proximal end and a distal end, said rod slidingly communicating with said guide bushing between an extended position and a retracted position;
   a retraction bushing mounted to said proximal end of said rod and slidingly engaging said inner surface of said body;
   an extension bushing mounted below said retraction bushing and coaxially mounted about said rod at a predetermined distance and slidingly communicating with said inner surface of said body;
   a knob perpendicularly mounted to said rod intermediate said retraction bushing and said extension bushing, said knob slidingly engaging said generally Z-shaped channel and further radially extending a predetermined distance beyond said generally Z-shaped channel; and
   an extension spring coiled about said rod below said extension bushing, said spring engaging said guide bushing of said body when said rod is in said extended position, and said spring proximally urging said extension bushing when said rod in said extended position;

an end cap enclosing said distal end of said body and having:
   an inner surface and an outer surface; and
   a retraction spring mounted to said inner surface of said end cap, said retraction spring distally urging said rod when said rod is in said retracted position;

means for removably maintaining said rod in said extended position; and means for removably maintaining said rod in said retracted position.

7. The striker according to claim 6 wherein:

said means for removably maintaining said rod in said retracted position comprises:

a retraction slot located at said proximal end of said generally Z-shaped channel, whereupon insertion of said knob into said retraction slot, said knob is distally urged against said retraction slot, thereby removably maintaining said rod in said retracted position; and an extension slot located at said distal end of said generally Z-shaped channel, whereupon insertion of said knob into said extension slot, said knob is proximally urged against said extension slot, thereby removably maintaining said rod in said extended position; and said generally Z-shaped channel has a travel slot intermediate said retraction slot and said extension slot, for slidingly receiving said knob.

8. The striker according to claim 6 further comprising a clip axially mounted to said outer surface of said body.

9. The striker according to claim 6 wherein said body, said rod, said guide bushing, said retraction bushing, said extension bushing and said end cap are comprised of material selected from the group consisting of wood, plastic and rubber.

10. The striker according to claim 6 wherein said knob has a shaft that adjustably threadedly and diametrically penetrates said rod to removably engage said Z shaped channel.

11. A striker for use with a game call striking surface comprising:

a body having:
   an inner surface and an outer surface;
   an open proximal end and an open distal end;
   a guide bushing affixed to said open distal end;
   a clip axially mounted to said outer surface of said body a dowel assembly comprising:
   a rod coaxially and rotatably disposed within said body and having a proximal end and a distal end, said rod slidingly communicating with said guide bushing between an extended position and a retracted position;
   a retraction bushing mounted to said proximal end of said rod and slidingly communicating with said inner surface of said body;
   an extension bushing mounted below said retraction bushing and coaxially mounted about said rod at a predetermined distance and slidingly communicating with said inner surface of said body;
   a knob perpendicularly mounted to said rod intermediate said retraction bushing and said extension bushing, said knob slidingly engaging a generally Z-shaped channel and further radially extending a predetermined distance beyond said generally Z-shaped channel, and further having a shaft adjustably threadedly and diametrically penetrating said rod; and
   an extension spring coiled about said rod below said extension bushing, said spring engaging said guide bushing of said body when said rod is in said extended position, and said spring proximally urging said extension bushing when said rod in said extended position;

an end cap enclosing said proximal end of said body and having:
  an inner surface and an outer surface; and
  a retraction spring mounted to said inner surface of said end cap, said retraction spring distally urging said rod when said rod is in said retracted position; and
said generally Z-shaped channel present along said body and having a proximal end and a distal end, and comprising:
  a retraction slot for slidingly receiving said knob and located at said proximal end of said generally Z-shaped channel, whereupon insertion of said knob into said retraction slot, said knob is distally urged against said retraction slot, thereby removably maintaining said rod in said retracted position; and
  an extension slot located at said distal end of said generally Z-shaped channel, whereupon insertion of said knob into said extension slot, said knob is proximally urged against said extension slot, thereby removably maintaining said rod in said extended position; and
  a travel slot intermediate and in open communication with said retraction slot and said extension slot, for slidingly receiving said knob.

\* \* \* \* \*